(12) United States Patent
Wu et al.

(10) Patent No.: US 11,204,860 B2
(45) Date of Patent: Dec. 21, 2021

(54) METHODS AND APPARATUSES FOR GENERATING SMART CONTRACT TEST CASE

(71) Applicant: ALIPAY (HANGZHOU) INFORMATION TECHNOLOGY CO., LTD., Zhejiang (CN)

(72) Inventors: Meng Wu, Hangzhou (CN); Haijun Wang, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/357,916

(22) Filed: Jun. 24, 2021

(65) Prior Publication Data

US 2021/0318947 A1 Oct. 14, 2021

(30) Foreign Application Priority Data

Sep. 30, 2020 (CN) .......................... 202011054152.1

(51) Int. Cl.
*G06F 9/44* (2018.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC ............. G06F 11/3684; G06F 11/3688; G06F 11/3692

See application file for complete search history.

(56) References Cited

U.S. PATENT DOCUMENTS 9,934,138 B1 4/2018 Bache et al.
2018/0157583 A1* 6/2018 Bache ................. G06F 11/3688
(Continued)

FOREIGN PATENT DOCUMENTS

CN 107239392 10/2017
CN 110046089 7/2019
(Continued)

OTHER PUBLICATIONS

Wu et al. (Mutation Testing for Ethereum Smart Contract) (Year: 2019).*

(Continued)

*Primary Examiner* — Chat C Do
*Assistant Examiner* — Lenin Paulino
(74) *Attorney, Agent, or Firm* — Fish & Richardson P.C.

(57) ABSTRACT

Embodiments of the present specification provide a method and an apparatus for generating a smart contract test case. A test case that can be parsed by the smart contract includes one or more structured parameters, and the structured parameters are used to invoke interfaces of the smart contract. If a structured parameter can be identified by an interface of the smart contract, a mutated structured parameter obtained by mutating the structured parameter based on a parameter structure of the structured parameter can also be identified by the interface of the smart contract, a test case including the mutated structured parameter can be generated, which ensures that the test case generated can be executed by the smart contract and can cover a deeper program path in the smart contract, thereby improving the efficiency of testing the smart contract.

14 Claims, 7 Drawing Sheets

(56) References Cited

U.S. PATENT DOCUMENTS

2019/0138433 A1* 5/2019 Krishnan ............ G06F 11/3688
2019/0303623 A1* 10/2019 Reddy ................. G06F 11/3692

FOREIGN PATENT DOCUMENTS

| CN | 110196813 | 9/2019 |
| CN | 110221956 | 9/2019 |
| CN | 111459786 | 7/2020 |

OTHER PUBLICATIONS

Chapman et al. (Deviant: A Mutation Testing Tool for Solidity Smart Contracts) (Year: 2019).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

METHODS AND APPARATUSES FOR GENERATING SMART CONTRACT TEST CASE

CROSS-REFERENCE TO RELATED APPLICATIONS

This application claims priority to Chinese Patent Application No. 202011054152.1, filed on Sep. 30, 2020, which is hereby incorporated by reference in its entirety.

TECHNICAL FIELD

One or more embodiments of the present specification relate to the field of blockchain technologies, and in particular, to methods and apparatuses for generating a test case used to test a smart contract in a blockchain system.

BACKGROUND

A smart contract in a blockchain system is a set of commitments defined in the form of digits, which includes the agreements on execution of the defined commitments by contract participants. Through the smart contract, the participants that do not trust each other can automatically carry out the agreements without the intervention of a centralized third party. The smart contract is fully transparent to the participants in the blockchain system, and it is difficult to be changed once deployed. Therefore, the smart contract needs to be tested before being deployed so as to ensure the security and correctness of the deployed smart contract.

During testing of a smart contract, a series of test cases need to be generated as inputs of the smart contract, so that different program paths can be covered when the smart contract executes the test cases, and the smart contract can be comprehensively tested. Since interfaces on the smart contract can parse only data in a specific format, it is difficult to efficiently generate test cases that can be parsed through the smart contract.

Therefore, an improved solution is desired to more efficiently generate test cases that can be parsed through smart contract data.

SUMMARY

One or more embodiments of the present specification describe methods and apparatuses for generating a smart contract test case, which can more efficiently generate test cases that can be parsed through smart contract data.

According to a first aspect, the present specification provides a method for generating a smart contract test case, including the following:

For a current test case, at least one to-be-mutated structured parameter is selected from each structured parameter included in the test case, where the to-be-mutated structured parameter can be identified by at least one interface of a to-be-tested smart contract; for each to-be-mutated structured parameter, a parameter structure corresponding to the to-be-mutated structured parameter is obtained, where the parameter structure is determined by analyzing a pre-constructed sample structured parameter, and the sample structured parameter can be identified by at least one interface of the to-be-tested smart contract; for each to-be-mutated structured parameter, the to-be-mutated structured parameter is mutated based on the parameter structure corresponding to the to-be-mutated structured parameter, to obtain a mutated structured parameter; and a test case including each mutated structured parameter is generated and used as a test case input to the to-be-tested smart contract.

In a possible implementation, each structured parameter includes at least one piece of raw type data, and the parameter structure includes a data type of raw type data; and in this case, the mutating the to-be-mutated structured parameter based on the parameter structure corresponding to the to-be-mutated structured parameter includes: selecting at least one piece of to-be-mutated raw type data from all pieces of raw type data included in the to-be-mutated structured parameter; determining a data type of each piece of to-be-mutated raw type data based on the parameter structure corresponding to the to-be-mutated structured parameter; and performing parameter value mutation on the to-be-mutated raw type data based on the data type of each piece of to-be-mutated raw type data, to change a parameter value of the to-be-mutated structured parameter.

In a possible implementation, the performing parameter value mutation on the to-be-mutated raw type data based on the data type of each piece of to-be-mutated raw type data includes: if a data type of a to-be-mutated raw type data is a data type with an unlimited length, performing at least one of modifying a byte value, deleting a byte, inserting a byte, and shifting a byte on the to-be-mutated raw type data; or if a data type of a to-be-mutated raw type data is a data type with a limited length, performing at least one of modifying a byte value and shifting a byte on the to-be-mutated raw type data.

In a possible implementation, the data type with an unlimited length includes a string type; and the data type with a limited length includes a 64-bit integer type or a 256-bit hash type.

In a possible implementation, each structured parameter includes at least one piece of raw type data, and the parameter structure includes a start location or an end location of raw type data; and in this case, the mutating the to-be-mutated structured parameter based on the parameter structure corresponding to the to-be-mutated structured parameter includes: determining a start location or an end location of each piece of raw type data in the to-be-mutated structured parameter based on the start location or the end location of the raw type data included in the parameter structure; and adding at least one piece of raw type data before a start location or after an end location of at least one piece of raw type data included in the to-be-mutated structured parameter, to change the parameter structure of the to-be-mutated structured parameter.

In a possible implementation, each structured parameter includes at least two pieces of raw type data, and the parameter structure includes a start location or an end location of raw type data; and in this case, the mutating the to-be-mutated structured parameter based on the parameter structure corresponding to the to-be-mutated structured parameter includes: determining a start location or an end location of each piece of raw type data in the to-be-mutated structured parameter based on the start location or the end location of the raw type data included in the parameter structure; and deleting at least one piece of raw type data based on the start location or the end location of each piece of raw type data included in the to-be-mutated structured parameter, to change the parameter structure of the to-be-mutated structured parameter.

In a possible implementation, each structured parameter includes at least two pieces of raw type data, and the parameter structure includes a sequence of all pieces of raw type data; and in this case, the mutating the to-be-mutated structured parameter based on the parameter structure corresponding to the to-be-mutated structured parameter includes: determining a sequence of all pieces of raw type data in the to-be-mutated structured parameter based on the parameter structure corresponding to the to-be-mutated structured parameter; and changing the sequence of all the pieces of raw type data in the to-be-mutated structured parameter, to change the parameter structure of the to-be-mutated structured parameter.

In a possible implementation, before the selecting, for a current test case, at least one to-be-mutated structured parameter from structured parameters included in the test case, the method further includes: determining a test case previously executed by the to-be-tested smart contract as the current test case.

In a possible implementation, before the selecting, for a current test case, at least one to-be-mutated structured parameter from structured parameters included in the test case, the method further includes: determining a test case manually generated as the current test case.

In a possible implementation, the determining a test case previously executed by the to-be-tested smart contract as the current test case includes: determining a previous test case input to the to-be-tested smart contract as a first test case; determining whether a new program path is covered when the to-be-tested smart contract executes the first test case; and if yes, determining the first test case as the current test case; or if no, determining a second test case as the current test case, where the second test case satisfies the following: the second test case has been input to the to-be-tested smart contract, and the first test case is obtained by mutating a structured parameter in the second test case.

According to a second aspect, the present specification further provides an apparatus for generating a smart contract test case, including: a parameter selection unit, configured to select, for a current test case, at least one to-be-mutated structured parameter from structured parameters included in the test case, where the to-be-mutated structured parameter can be identified by at least one interface of a to-be-tested smart contract; a structure identification unit, configured to: for each to-be-mutated structured parameter selected by the parameter selection unit, obtain a parameter structure corresponding to the to-be-mutated structured parameter, where the parameter structure is determined by analyzing a pre-constructed sample structured parameter, and the sample structured parameter can be identified by at least one interface of the to-be-tested smart contract; a parameter mutation unit, configured to: for each to-be-mutated structured parameter, mutating the to-be-mutated structured parameter based on the parameter structure corresponding to the to-be-mutated structured parameter that is obtained by the structure identification unit, to obtain a mutated structured parameter; and a case generation unit, configured to generate a test case including each mutated structured parameter obtained by the parameter mutation unit, and use the test case as a test case input to the to-be-tested smart contract.

In a possible implementation, each structured parameter includes at least one piece of raw type data, and the parameter structure includes a data type of raw type data; and in this case, the parameter mutation unit includes: a data selection subunit, configured to select at least one piece of to-be-mutated raw type data from all pieces of raw type data included in one to-be-mutated structured parameter; a type identification subunit, configured to determine a data type of each piece of to-be-mutated raw type data selected by the data selection subunit based on the parameter structure corresponding to the to-be-mutated structured parameter; and a first mutation subunit, configured to perform parameter value mutation on the to-be-mutated raw type data based on the data type of each piece of to-be-mutated raw type data that is determined by the type identification subunit, to change a parameter value of a to-be-mutated structured parameter including the to-be-mutated raw data type.

In a possible implementation, the first mutation subunit is configured to: for each piece of to-be-mutated raw type data, if a data type of the to-be-mutated raw type data is a data type with an unlimited length, perform at least one of modifying a byte value, deleting a byte, inserting a byte, and shifting a byte on the to-be-mutated raw type data; or if a data type of the to-be-mutated raw type data is a data type with a limited length, perform at least one of modifying a byte value and shifting a byte on the to-be-mutated raw type data.

In a possible implementation, the data type with an unlimited length includes a string type; and the data type with a limited length includes a 64-bit integer type or a 256-bit hash type.

In a possible implementation, each structured parameter includes at least one piece of raw type data, and the parameter structure includes a start location or an end location of raw type data; and in this case, the parameter mutation unit includes: a first location identification subunit, configured to determine a start location or an end location of each piece of raw type data in the to-be-mutated structured parameter based on a start location or an end location of at least one piece of raw type data included in the parameter structure; and a data adding subunit, configured to: for one to-be-mutated structured parameter, add at least one piece of raw type data before a start location or after an end location of at least one piece of raw type data included in the to-be-mutated structured parameter based on the start location or the end location of each piece of raw type data in the to-be-mutated structured parameter that is determined by the first location identification subunit, to change the parameter structure of the to-be-mutated structured parameter.

In a possible implementation, each structured parameter includes at least two pieces of raw type data, and the parameter structure includes a start location or an end location of raw type data; and in this case, the parameter mutation unit includes: a second location identification subunit, configured to determine a start location or an end location of each piece of raw type data in the to-be-mutated structured parameter based on the start location or the end location of the raw type data included in the parameter structure; and a data deletion subunit, configured to: for one to-be-mutated structured parameter, delete at least one piece of raw type data in the to-be-mutated structured parameter based on the start location or the end location of each piece of raw type data in the to-be-mutated structured parameter that is determined by the second location identification subunit, to change the parameter structure of the to-be-mutated structured parameter.

In a possible implementation, each structured parameter includes at least two pieces of raw type data, and the parameter structure includes a sequence of all pieces of raw type data; and in this case, the parameter mutation unit includes: a sequence identification subunit, configured to determine a sequence of all pieces of raw type data in one to-be-mutated structured parameter based on the parameter structure corresponding to the to-be-mutated structured parameter; and a data sequence adjustment subunit, configured to: for one to-be-mutated structured parameter, change a sequence of all pieces of raw type data in the to-be-mutated structured parameter based on a sequence of all the pieces of raw type data in the to-be-mutated structured parameter that is determined by the sequence identification subunit, to change a parameter structure of the to-be-mutated structured parameter.

In a possible implementation, the apparatus for generating a smart contract test case further includes: a first case acquisition unit, configured to determine a test case previously executed by the to-be-tested smart contract as the current test case.

In a possible implementation, the apparatus for generating a smart contract test case further includes: a second case acquisition unit, configured to determine a test case manually generated as the current test case.

In a possible implementation, the first case acquisition unit is configured to determine a previous test case input to the to-be-tested smart contract as a first test case; determine whether a new program path is covered when the to-be-tested smart contract executes the first test case; and if yes, determine the first test case as the current test case; or if no, determine a second test case as the current test case, where the second test case satisfies the following: the second test case has been input to the to-be-tested smart contract, and the first test case is obtained by mutating a structured parameter in the second test case.

According to a third aspect, the present specification provides a computer-readable storage medium. The computer-readable storage medium stores computer programs, and when being executed in a computer, the computer programs enable the computer to perform the methods provided in any one of the first aspect and the possible implementations of the first aspect.

According to a fourth aspect, the present specification provides a computing device, including a memory and a processor. The memory stores executable code, and the processor implements the method provided in any one of the first aspect and the possible implementations of the first aspect when executing the executable code.

According to the methods and the apparatuses for generating a smart contract test case provided in the embodiments of the present specification, after a parameter structure of a to-be-mutated structured parameter is obtained, the to-be-mutated structured parameter is mutated based on the parameter structure to obtain a mutated structured parameter, and then a test case including the mutated structured parameter is obtained, to ensure that the test case generated can be parsed and executed by a to-be-tested smart contract and can cover a deeper program path in the to-be-tested smart contract, thereby improving the efficiency of testing the to-be-tested smart contract.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

As mentioned earlier, to ensure the correctness of a smart contract to be deployed in a blockchain system, the smart contract needs to be tested before being deployed in the blockchain system. The basic idea of testing a smart contract is to generate a series of test cases that are used as inputs to simulate actual use processes of the smart contract, obtain an execution action or an output result of the smart contract after the test cases generated are input to the smart contract, and then determine whether an error exists in the smart contract based on a matching degree between the test cases inputs and the execution actions or output results obtained.

However, interface parameters of the smart contract are generally designed as serializable complex data structures for ease of data transmission between different nodes in the blockchain system. The test case used to test the smart contract includes one or more structured parameters. When the test case is executed by the smart contract, each structured parameter invokes one interface of the smart contract. The structured parameter will be identified by the interface invoked by the structured parameter only when a parameter structure of the structured parameter satisfies an interface parameter of the interface invoked. When test cases are generated by using a simple random mutation policy, for example, randomly deleting a byte, repeating a byte, inserting a byte, or shifting a byte leftward or rightward, a majority of the test cases generated cannot be parsed by the smart contract because parameter structures of structured parameters in the test cases do not satisfy corresponding interface parameters. The test cases that cannot be parsed by the smart contract cannot be further executed by the smart contract, and cannot cover deeper program paths in the smart contract, affecting the efficiency of testing the smart contract.

To efficiently generate a test case that can be parsed by the smart contract, based on the concept of the embodiments of the present specification, because the test case includes one or more structured parameters, and the structured parameters are used to invoke interfaces of the smart contract, if a structured parameter can be identified by an interface of the smart contract, a mutated structured parameter obtained by mutating the structured parameter based on a parameter structure of the structured parameter can also be identified by the interface of the smart contract, so that a test case including the mutated structured parameter can be generated, which ensures that the test case generated can be executed by the smart contract and can cover a deeper program path in the smart contract, thereby improving the efficiency of testing the smart contract.

Figure 1:
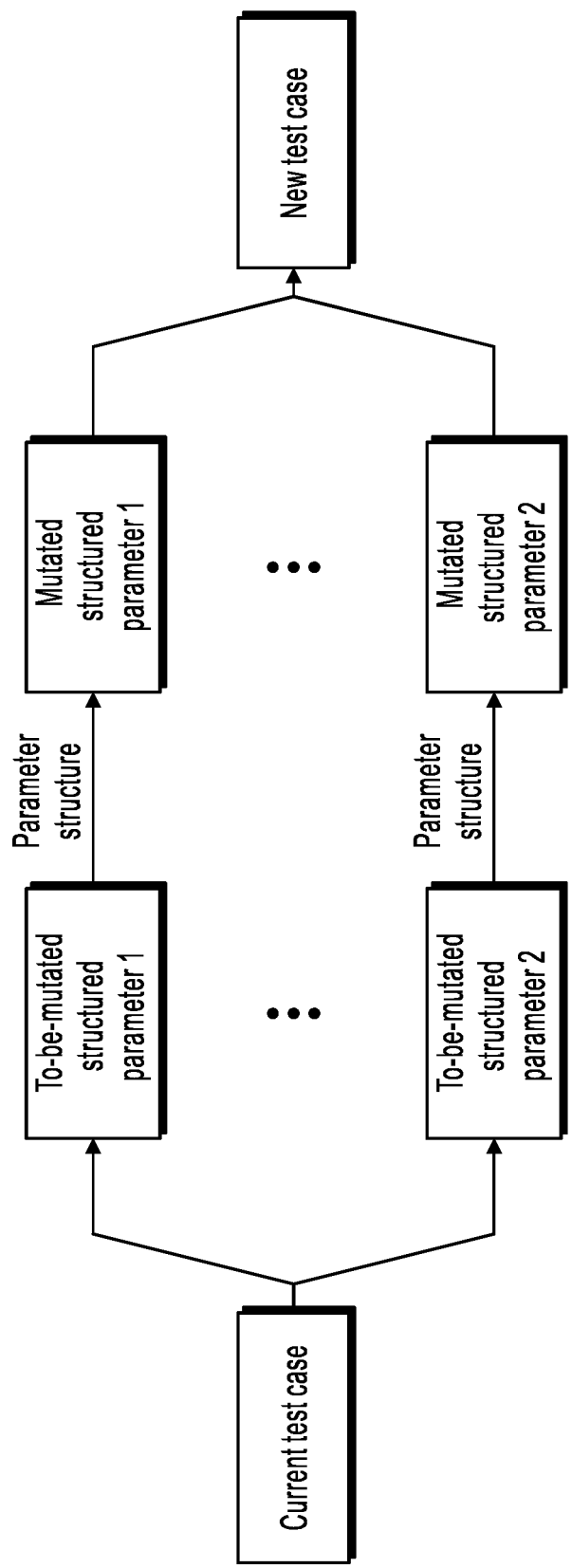
FIG. 1 is a schematic diagram illustrating an implementation scenario, according to one or more embodiments of the present specification.

FIG. 1 is a schematic diagram illustrating an implementation scenario of one or more embodiments disclosed in the present specification. As shown in FIG. 1, for a current test case, at least one to-be-mutated structured parameter is selected from each structured parameter included in the test case, and it is ensured that the selected to-be-mutated structured parameter can be identified by at least one interface of a to-be-tested smart contract. After a parameter structure of each to-be-mutated structured parameter is determined, the to-be-mutated structured parameter is mutated based on the parameter structure of the to-be-mutated structured parameter, to obtain a corresponding mutated structured parameter. Further, a next test case including each mutated structured parameter is generated, and the test case generated will be input to the to-be-tested smart contract to test the to-be-tested smart contract. The to-be-tested structured parameter can be identified by at least one interface of the to-be-tested smart contract, and a mutated structured parameter and a corresponding to-be-mutated structured parameter have the same parameter structure. Therefore, the mutated structured parameter can also be identified by at least one interface of the to-be-tested smart contract, so that a test case generated including each mutated structured parameter can be executed by the to-be-tested smart contract and can cover a deeper program path in the to-be-tested smart contract, thereby improving the efficiency of testing the to-be-tested smart contract. The following describes a specific implementation process of generating a smart contract test case.

Figure 2:
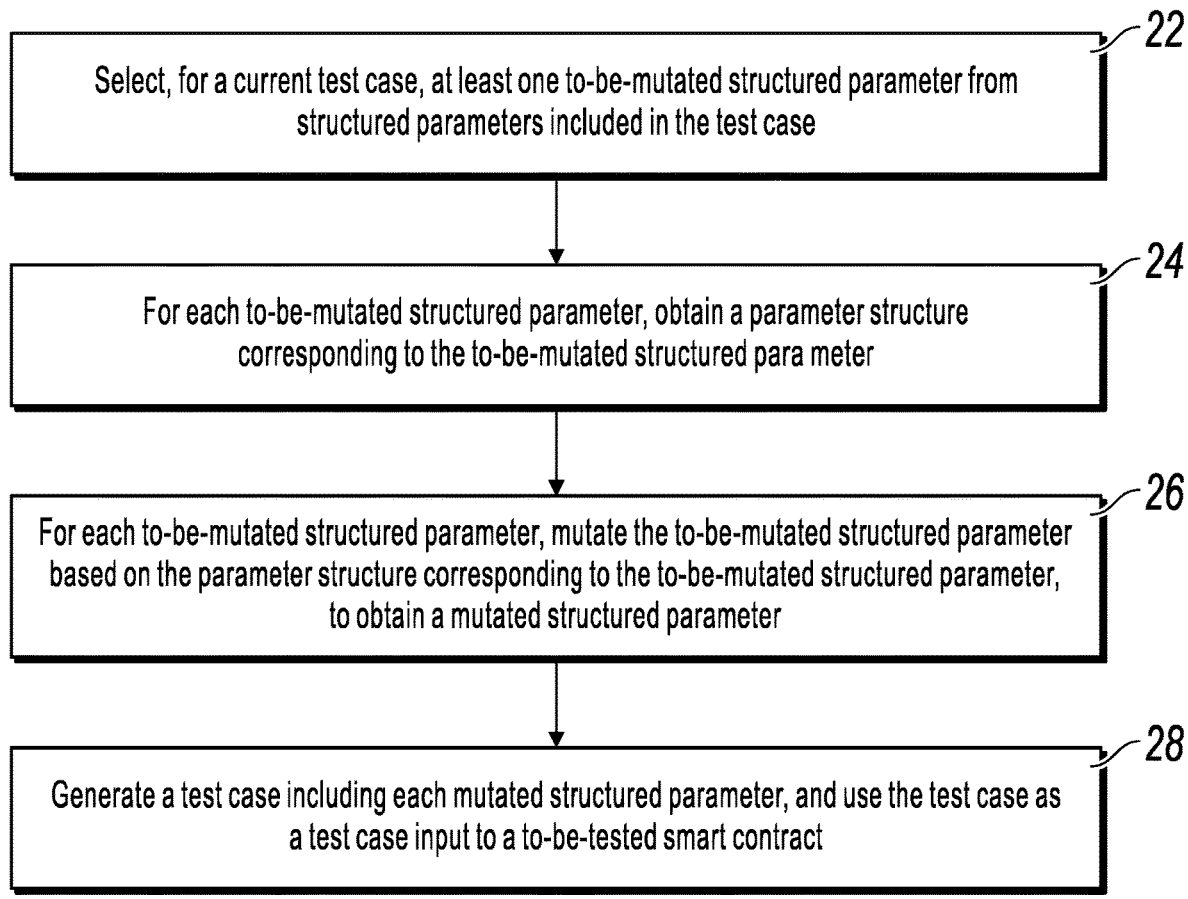
FIG. 2 is a flowchart illustrating a method for generating a smart contract test case, according to one or more embodiments of the present specification.

FIG. 2 illustrates a method for generating a smart contract test case, according to one or more embodiments. It can be understood that the method can be performed by any apparatus, device, platform, or device cluster with computing and processing capabilities. As shown in FIG. 2, the method for generating a smart contract test case can include the following steps.

Step 22: Select, for a current test case, at least one to-be-mutated structured parameter from structured parameters included in the test case, where the to-be-mutated structured parameter can be identified by at least one interface of a to-be-tested smart contract.

Step 24: For each to-be-mutated structured parameter, obtain a parameter structure corresponding to the to-be-mutated structured parameter, where the parameter structure is determined by analyzing a pre-constructed sample structured parameter, and the sample structured parameter can be identified by at least one interface of the to-be-tested smart contract.

Step 26: For each to-be-mutated structured parameter, mutate the to-be-mutated structured parameter based on the parameter structure corresponding to the to-be-mutated structured parameter, to obtain a mutated structured parameter.

Step 28: Generate a test case including each mutated structured parameter, and use the test case as a test case input to the to-be-tested smart contract.

In the embodiments, for a current test case, one or more to-be-mutated structured parameters are selected from to-be-mutated structured parameters included in the test case, and it is ensured that the selected to-be-mutated structured parameters can be identified by interfaces of the to-be-tested smart contract. Then, the to-be-mutated structured parameters are mutated based on parameter structures of the to-be-mutated structured parameters, to obtain mutated structured parameters. The mutated structured parameters have the same parameter structures as the corresponding to-be-mutated structured parameters, and further, a test case including the to-be-mutated structured parameters is generated and used as a test case input to the to-be-tested smart contract. Because a mutated structured parameter and a corresponding to-be-mutated structured parameter have the same parameter structure, and the to-be-mutated structured parameter can be identified by an interface of the to-be-tested smart contract, the mutated structured parameter can also be identified by the interface of the to-be-tested smart contract, so that a test case generated can be executed by the to-be-tested smart contract and can cover a deeper program path in the to-be-tested smart contract, thereby improving the efficiency of testing the to-be-tested smart contract.

In step 22, a to-be-mutated structured parameter is selected from structured parameters included in a current test case, and it is ensured that the selected to-be-mutated structured parameter can be identified by an interface of the to-be-tested smart contract. It can be understood that the to-be-tested smart contract includes at least one interface, each to-be-tested structured parameter selected can be identified by at least one interface included in the to-be-tested smart contract, and the current test case includes at least one structured parameter. Preferably, each structured parameter included in the current test case can be identified by at least one interface of the to-be-tested smart contract.

Each structured parameter in the test case is used to invoke one interface of the to-be-tested smart contract, and different structured parameters may be used to invoke the same interface of the to-be-tested smart contract. If each structured parameter included in the current test case can be identified by at least one interface of the to-be-tested smart contract, when a new test case is generated based on the current test case, there are a relatively large number of available to-be-mutated structured parameters, so that a plurality of different test cases can be generated.

Still further, each structured parameter included in the current test case can be identified by an interface invoked by the structured parameter. Therefore, the current test case can be fully parsed and executed by the to-be-tested smart contract, and further, a new test case generated based on the current test case can also be fully parsed and executed by the to-be-tested smart contract. As such, program paths that can be covered by a single test case can be increased, so that the efficiency of testing the smart contract is further improved.

In step 24, for each to-be-mutated structured parameter selected, a parameter structure of the to-be-mutated structured parameter is obtained, so that the corresponding to-be-mutated structured parameter is mutated subsequently based on the parameter structure. The mutated structured parameter and the corresponding to-be-mutated structured parameter have the same parameter structure, which ensures that the mutated structured parameter obtained can be identified by an interface of the to-be-tested smart contract.

Specifically, for a current test case, the test case includes at least one structured parameter, and the structured parameter included in the test case can be a pre-constructed sample structured parameter, or can be a structured parameter obtained by mutating the sample structured parameter. The structured parameter obtained by mutating the sample structured parameter is a structured parameter obtained by mutating the sample structured parameter one or more times. The sample structured parameter can be identified by at least one interface of the to-be-tested smart contract. In the process of generating the test case by mutating the structured parameter, the to-be-mutated structured parameter and the mutated structured parameter have the same parameter structure. As a result, because the structured parameter obtained by mutating the sample structured parameter and the sample structured parameter have the same parameter structure, the structured parameter obtained by mutating the sample structured parameter can also be identified by at least one interface of the to-be-tested smart contract.

In the current test case, the structured parameter is a sample structured parameter or a structured parameter obtained by mutating the sample structured parameter. Therefore, each to-be-mutated structured parameter selected and at least one sample structured parameter have the same parameter structure. Therefore, a parameter structure of the to-be-mutated structured parameter can be determined based on a parameter structure of the sample structured parameter. The parameter structure of the sample structured parameter can be determined by performing structure analysis on the sample structured parameter. By using the parameter structure of the sample structured parameter, the parameter structure of the to-be-mutated structured parameter is determined without performing structure analysis on the to-be-mutated structured parameter each time a new test case is generated, so that the efficiency of generating a test case can be improved.

To construct a sample structured parameter, for each interface of the to-be-tested smart contract, one or more sample structured parameters that can be identified by the interface can be constructed based on an interface parameter of the interface. Or, an initial test case can be constructed for the to-be-tested smart contract. The initial test case includes at least one sample structured parameter. Each sample structured parameter can be identified by at least one interface of the to-be-tested smart contract, in other words, each sample structured parameter satisfies a complex data structure of at least one interface of the to-be-tested smart contract. When the sample structured parameter is obtained by constructing the initial test case, to ensure that each interface of the to-be-tested smart contract has an opportunity to be invoked by the test case generated, for each interface included in the to-be-tested smart contract, the initial test case includes at least one sample structured parameter that can be identified by the interface.

For example, the initial test case includes sample structured parameter 1, sample structured parameter 2, and sample structured parameter 3, the to-be-tested smart contract includes interface 1, interface 2, and interface 3, sample structured parameter 1 can be identified by interface 1, sample structured parameter 2 can be identified by interface 1 and interface 2, and the sample structured parameter 3 can be identified by interface 2 and interface 3. To-be-mutated structured parameter 1 and to-be-mutated structured parameter 2 are selected from a current test case.

To-be-mutated structured parameter 1 is sample structured parameter 1, and to-be-mutated structured parameter 2 is a structured parameter obtained by mutating sample structured parameter 2. Therefore, when parameter structures of to-be-mutated structured parameters are determined, it is determined that to-be-mutated structured parameter 1 and sample structured parameter 1 have the same parameter structure, and to-be-mutated structured parameter 2 and sample structured parameter 2 have the same parameter structure.

In step 28, a test case including each mutated structured parameter is generated and used as a test case input to the to-be-tested smart contract. When a test case is mutated to obtain a new test case, usually, not all structured parameters included in the test case are mutated, but only one or more of the structured parameters are selected as to-be-mutated structured parameters. Therefore, the new test case generated generally does not only include each mutated structured parameter. Therefore, a test case including each mutated structured parameter and structured parameters that are not selected as to-be-mutated structured parameters in the current test case can be generated and used as a test case input to the to-be-tested smart contract.

For example, the current test case includes structured parameter 1, structured parameter 2, and structured parameter 3. Structured parameter 1 is selected as a to-be-mutated structured parameter, structured parameter 1 is mutated to obtain structured parameter 1', and then a test case including structured parameter 1', structured parameter 2, and structured parameter 3 is generated and used as a test case input to the to-be-tested smart contract.

In addition, when the test case including each mutated structured parameter is generated, the test case generated can include all structured parameters that are not selected as to-be-mutated structured parameters in the current test case, or can include some of structured parameters that are not selected as to-be-mutated structured parameters in the current test case, or the test case generated can include structured parameters other than the mutated structured parameters and structured parameters in the current test case, but it needs to be ensured that each structured parameter in the test case generated can be identified by at least one interface of the to-be-tested smart contract.

In one or more embodiments, in step 26, a to-be-mutated structured parameter is mutated based on a parameter structure of the to-be-mutated structured parameter, to obtain a corresponding mutated structured parameter. Mutation performed on the to-be-mutated structured parameter can include at least one of the following two mutation forms:

Mutation form 1: Perform parameter value mutation on the to-be-mutated structured parameter to change a parameter value of the to-be-mutated structured parameter.

Mutation form 2: Perform parameter structure mutation on the to-be-mutated structured parameter to change a parameter structure of the to-be-mutated structured parameter.

The following separately describes the previous two mutation forms.

For mutation form 1:

When one to-be-mutated structured parameter includes at least one piece of raw type data, and a parameter structure of the to-be-mutated structured parameter is used to represent a data type of each piece of raw type data in the to-be-mutated structured parameter, at least one piece of to-be-mutated raw type data can be selected from all the pieces of raw type data included in the to-be-mutated structured parameter, then a data type of each piece of to-be-mutated raw type data is determined based on the parameter structure of the to-be-mutated structured parameter, and then parameter value mutation is performed on each to-be-mutated raw type data based on the data type of each to-be-mutated raw type data, to change a parameter value of the whole to-be-mutated structured parameter, and obtain a mutated structured parameter different from the to-be-mutated structured parameter.

Each test case includes one or more structured parameters, each structured parameter includes one or more pieces of raw type data, and each piece of raw type data includes a specific parameter value. Each structured parameter is used to invoke one interface of the to-be-tested smart contract. Different raw type data in the same structured parameter can have the same or different data types.

A parameter structure of a structured parameter can be used to represent a data type of each piece of raw type data in the structured parameter. The data type defines a data structure type of raw type data, and the data type can further define a count of bits in a byte included in the raw type data. The data structure type of the raw type data can be an integer type, a floating point type, a string type, or a Boolean type, and the count of bits in a byte included in the raw type data can be a fixed number or varying number. Therefore, the data type of the raw type data defines one or both of the data structure type and the count of bits in the byte. For example, a parameter structure of a structured parameter represents that the structured parameter includes raw type data 1, raw type data 2, and raw type data 3, a data type of raw type data 1 is a 64-bit integer type, a data type of raw type data 2 is a 256-bit hash type, and a data type of raw type data 3 is a string type.

Because the to-be-mutated structured parameter can be identified by at least one interface of the to-be-tested smart contract, a parameter structure of the to-be-mutated structured parameter corresponds to a complex data structure of a corresponding interface of the to-be-tested smart contract. The structured parameter satisfying the parameter structure can be parsed through data of the to-be-tested smart contract to invoke a corresponding interface, so that the structured parameter can be executed by the to-be-tested smart contract and a deeper program path in the to-be-tested smart contract can be covered.

To mutate a to-be-mutated structured parameter, parameter value mutation can be performed on only one piece of raw type data in the to-be-mutated structured parameter, or parameter value mutation can be performed on a plurality of pieces of raw type data in the to-be-mutated structured parameter. The quantity of pieces of raw type data involved when a to-be-mutated structured parameter is mutated can be defined based on a predetermined mutation policy. For example, each time a to-be-mutated structured parameter is mutated, parameter value mutation is performed on only one piece of raw type data in the to-be-mutated structured parameter.

Further, when parameter value mutation is performed on to-be-mutated raw type data, if a data structure defines only a data structure type of the to-be-mutated raw type data, in other words, a data type of the to-be-mutated raw type data is a data type with an unlimited length, at least one of modifying a byte value, deleting a byte, inserting a byte, and shifting a byte can be performed on the to-be-mutated raw type data, so that parameter value mutation is implemented on the to-be-mutated raw type data. If a data structure defines a data structure type of the to-be-mutated raw type data and a count of bits in a byte included, in other words, a data type of the to-be-mutated raw type data is a data type with a limited length, at least one of modifying a byte value and shifting a byte can be performed on the to-be-mutated raw type data, so that parameter value mutation is implemented on the to-be-mutated raw type data.

Modifying a byte value means modifying the value of a certain byte, for example, modifying the value of a certain byte in the to-be-mutated raw type data from 1 to 0. Shifting a byte means moving a certain byte in the to-be-mutated raw type data leftward or rightward by one or more bytes. In addition, when parameter value mutation is performed on the to-be-mutated raw type data, a certain byte in the to-be-mutated raw type data can be randomly selected for the operation of modifying a byte, deleting a byte, inserting a byte, or shifting a byte. Or, based on a predetermined mutation policy, bytes in the to-be-mutated raw type data can be selected sequentially for the operation of modifying a byte, deleting a byte, inserting a byte, or shifting a byte.

It can be understood that when parameter value mutation is performed on to-be-mutated raw type data by inserting a byte, one or more bytes in the to-be-mutated raw type data can be duplicated and inserted to corresponding locations in the to-be-mutated raw type data, avoiding the situation that when the value of an inserted node falls outside of an identifiable range, mutated raw type data cannot be identified by the to-be-tested smart contract. As such, the efficiency of generating a valid test case can be further improved.

When parameter value mutation is performed on to-be-mutated raw type data, parameter value mutation is performed on the to-be-mutated raw type data based on a data type of the to-be-mutated raw type data in a parameter structure, to ensure that mutated new raw type data and the to-be-mutated raw type data have the same data type, thereby ensuring that a mutated structured parameter generated can still be identified by a corresponding interface of the to-be-tested smart contract, and each test case generated can cover a deeper program path in the to-be-tested smart contract instead of covering only the shallowest program path in the to-be-tested smart contract that is used to parse and verify input data.

For mutation form 2:

Parameter structure mutation is performed on a to-be-mutated structured parameter to generate a mutated structured parameter describing different content from the to-be-mutated structured parameter. After the mutated structured parameter is input to the to-be-tested smart contract, a new program path in the to-be-tested smart contract may be covered. The parameter structure mutation performed on the to-be-mutated structured parameter mainly includes the following three structure mutation methods:

Structure mutation method 1: Add at least one piece of raw type data to the to-be-mutated structured parameter.

Structure mutation method 2: Delete at least one piece of raw type data from the to-be-mutated structured parameter.

Structure mutation method 3: Change a sequence of all pieces of raw type data in the to-be-mutated structured parameter.

For structure mutation method 1, the premise is that the to-be-mutated structured parameter includes at least one piece of raw type data, and a parameter structure of the to-be-mutated structured parameter is used to represent a start location or an end location of each piece of raw type data in the to-be-mutated structured parameter. When parameter structure mutation is performed on a to-be-mutated structured parameter, a start location or an end location of each piece of raw type data in the to-be-mutated structured parameter is first determined based on a parameter structure of the to-be-mutated structured parameter, and then at least one piece of raw type data is added before a start location or after an end location of at least one piece of raw type data included in the to-be-mutated structured parameter, to change the parameter structure of the to-be-mutated structured parameter.

For example, the structure form of a to-be-mutated structured parameter is raw type data 1-raw type data 2-raw type data 3. After start locations or end locations of raw type data 1, raw type data 2, and raw type data 3 are determined based on a parameter structure of the to-be-mutated structured parameter, raw type data 4 is added before the start location of raw type data 2 to generate a mutated structured parameter with such a form as raw type data 1-raw type data 4-raw type data 2-raw type data 3.

For another example, the structure form of a to-be-mutated structured parameter is raw type data 1-raw type data 2-raw type data 3. After start locations or end locations of raw type data 1, raw type data 2, and raw type data 3 are determined based on a parameter structure of the to-be-mutated structured parameter, raw type data 5 is added before the start location of raw type data 3, and raw type data 6 is added after the end location of raw type data 3 to generate a mutated structured parameter with such a form as raw type data 1-raw type data 2-raw type data 5-raw type data 3-raw type data 6.

It can be understood that when parameter structure mutation is performed on the to-be-mutated structured parameter by adding raw type data, one or more pieces of raw type data in the to-be-mutated structured parameter can be duplicated to corresponding locations in the to-be-mutated structured parameter, avoiding the situation that a parameter type of raw type data randomly generated cannot be identified by the to-be-tested smart contract, and therefore, a mutated structured parameter generated cannot invoke a corresponding interface. As such, it can be ensured that a test case generated through parameter structure mutation can be executed by the to-be-tested smart contract.

For structure mutation method 2, the premise is that the to-be-mutated structured parameter includes at least two pieces of raw type data, and a parameter structure of the to-be-mutated structured parameter is used to represent a start location or an end location of each piece of raw type data in the to-be-mutated structured parameter. When parameter structure mutation is performed on a to-be-mutated structured parameter, a start location or an end location of each piece of raw type data in the to-be-mutated structured parameter is first determined based on a parameter structure of the to-be-mutated structured parameter, and then at least one piece of raw type data is deleted based on the start location or the end location of each piece of raw type data in the to-be-mutated structured parameter, to change the parameter structure of the to-be-mutated structured parameter.

For example, the structure form of a to-be-mutated structured parameter is raw type data 1-raw type data 2-raw type data 3. After start locations or end locations of raw type data 1, raw type data 2, and raw type data 3 are determined based on a parameter structure of the to-be-mutated structured parameter, raw type data 2 is deleted to generate a mutated structured parameter with such a form as raw type data 1-raw type data 3.

For structure mutation method 3, because structured parameters that include the same raw type data in different sequences describe different content, program paths covered when the smart contract executes the structured parameters that include raw type data in different sequences are different. For example, both structured parameter A and structured parameter B include raw type data 1 to raw type data 3, but a sequence of the three pieces of raw type data in structured parameter A is raw type data 1-raw type data 2-raw type data 3, and a sequence of the three pieces of raw type data in structured parameter B is raw type data 3-raw type data 2-raw type data 1.

For structure mutation method 3, the premise is that the to-be-mutated structured parameter includes at least two pieces of raw type data, and a parameter structure of the to-be-mutated structured parameter is used to represent a sequence of all pieces of raw type data in the to-be-mutated structured parameter. When parameter structure mutation is performed on a to-be-mutated structured parameter, a sequence of all pieces of raw type data in the to-be-mutated structured parameter can be first determined based on a parameter structure of the to-be-mutated structured parameter, and then the sequence of all the pieces of raw type data in the to-be-mutated structured parameter is changed, to change the parameter structure of the to-be-mutated structured parameter.

For example, the structure form of a to-be-mutated structured parameter is raw type data 1-raw type data 2-raw type data 3. After a sequence of raw type data 1, raw type data 2, and raw type data 3 is determined based on a parameter structure of the to-be-mutated structured parameter, respective locations of raw type data 1 and raw type data 3 in the to-be-mutated structured parameter are switched to generate a mutated structured parameter with such a form as raw type data 3-raw type data 2—raw type data 1.

In conclusion, when parameter structure mutation is performed on the to-be-mutated structured parameter, at least one of adding raw type data, deleting raw type data, or changing a sequence of raw type data can be performed on the to-be-mutated structured parameter. When parameter structure mutation is performed on a to-be-mutated structured parameter, the operation of adding raw type data, deleting raw type data, or changing a sequence of raw type data can be randomly performed in the to-be-mutated structured parameter, or the delete operation, insert operation, or sequence change operation can be sequentially performed on all pieces of raw type data in the to-be-mutated structured parameter based on a predetermined mutation policy.

When parameter structure mutation is performed on a to-be-mutated structured parameter, mutation is performed on the quantity or sequence of raw type data in the to-be-mutated structured parameter based on a parameter structure of the to-be-mutated structured parameter, to generate a mutated structured parameter, so that a test case including different structured parameters can be generated. Raw type data included in the structured parameters in the test case can still be identified by an interface of the to-be-tested smart contract, so that a test case that may cover a new program path in the to-be-tested smart contract can be generated, and the comprehensiveness of testing the to-be-tested smart contract can be improved while ensuring that the test case generated can be executed by the to-be-tested smart contract.

In addition, based on the previous descriptions of performing parameter value mutation and parameter structure mutation on the to-be-mutated structured parameter, the parameter structure can represent not only a data type of raw type data in the structured parameter, but also a sequence of all pieces of raw type data in the structured parameter and a start location or an end location of each piece of raw type data. A parameter structure of a structured parameter can be represented by using a parameter structure template in a tree structure. The parameter structure template includes at least one parameter structure node, the parameter structure nodes form a tree structure, and each upper-layer parameter structure node in the tree structure includes at least one lower-layer parameter structure node or at least one piece of raw type data.

A parameter structure template is in a tree structure, and the parameter structure template in the tree structure includes a plurality of layers. The bottommost layer is raw type data, each layer other than the bottommost layer includes at least one parameter structure node, each upper-layer parameter structure node includes at least one lower-layer parameter structure node or at least one piece of raw type data, and a parameter structure node at the topmost layer represents a type name of a corresponding structured parameter. When parameter structure mutation is performed on a structured parameter, one or more parameter structure nodes are selected from a parameter structure template corresponding to the structured parameter for the delete operation, the insert operation, or the sequence change operation, so that parameter structure mutation can be implemented on a single piece of raw type data or a combination of a plurality of pieces of raw type data, making parameter structure mutation of the structured parameter more diversified. As such, personalized needs of different users can be satisfied, and also, the efficiency of generating a test case through parameter structure mutation can be improved.

Figure 3:
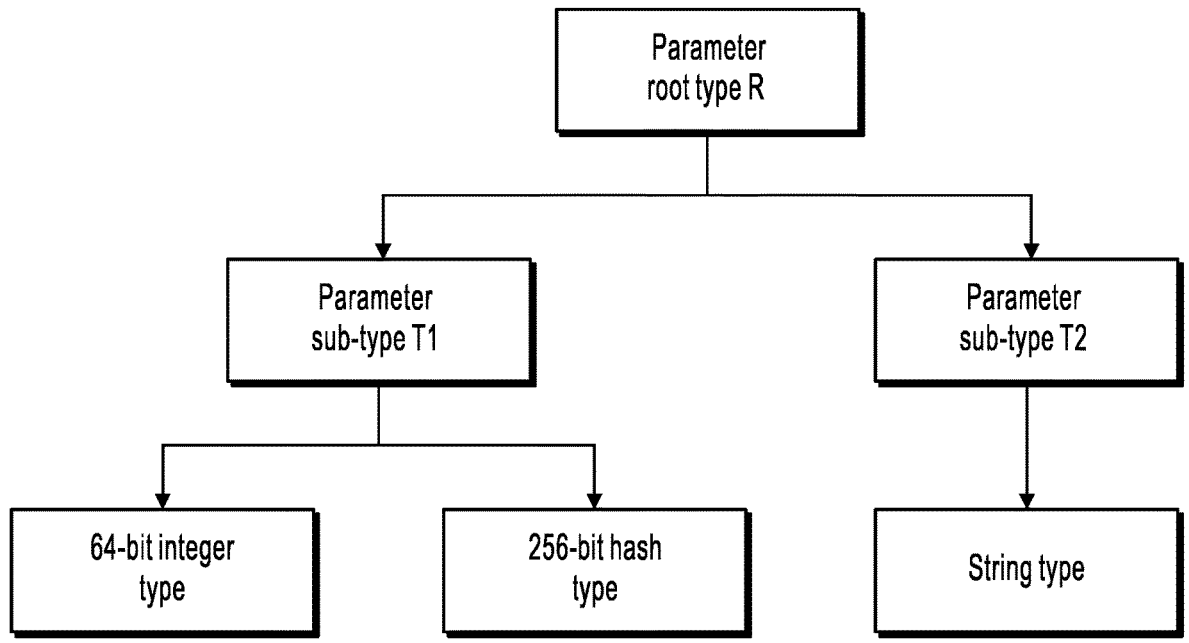
FIG. 3 is a schematic diagram illustrating a parameter structure template, according to one or more embodiments of the present specification.

FIG. 3 shows a parameter structure template in a tree structure. A root node of the parameter structure template is parameter root type R used to represent a type name of a corresponding structured parameter, child nodes are parameter sub-type T1 and parameter sub-type T2 used to represent member types of parent nodes, leaf nodes are three pieces of raw type data, raw type data of a 64-bit integer type and raw type data of a 256-bit hash type are leaf nodes of the child node named parameter sub-type T1, and raw type data of a string type is a leaf node of the child node named parameter sub-type T2.

Based on the parameter structure template shown in FIG. 3, it can be determined that a corresponding structured parameter includes three pieces of raw type data. Data type and character lengths of the three pieces of raw type data are respectively a 64-bit integer type, a 256-bit Hash type, and a string type, and a character length of the string type is any length. In addition, it can be further determined that a sequence of the three pieces of raw type data is 64-bit integer type-256-bit hash type—string type.

Based on the description in the previous embodiment, when a to-be-mutated structured parameter is mutated to obtain a mutated structured parameter, parameter value mutation can be performed only on the to-be-mutated structured parameter, or parameter structure mutation can be performed only on the to-be-mutated structured parameter, or both parameter value mutation and parameter structure mutation can be performed on the to-be-mutated structured parameter.

In one or more embodiments, before the to-be-mutated structured parameter is selected from the structured parameters in step 22, a test case previously executed by the to-be-tested smart contract can be determined as the current test case, or a test case manually generated can be determined as the current test case.

Using a test case previously executed by the to-be-tested smart contract as the current test case, a new test case can be generated based on a program path covered when the to-be-tested smart contract executes the previous test case. Generating a pertinent new test case that may cover a new program path can not only further improve the efficiency of testing the to-be-tested smart contract, but also implement the fully automated test of the to-be-tested smart contract and reduce labor intensity of test personnel during the smart contract test.

Determining a test case manually generated as the current test case, when a test case starts to be generated, the test case manually generated is used as the current test case, so that the process of generating test cases can be sequentially performed. Using a test case manually generated as the current test case in the process of generating test cases, a test case can be manually generated for a program path that is not covered in the to-be-tested smart contract and used as the current test case. Further, a test case obtained by mutating the test case can more quickly cover a program path that is not covered in the to-be-tested smart contract, so that the efficiency of testing the smart contract is further improved.

Further, when a test case previously executed by the to-be-tested smart contract is determined as the current test case, a previous test case input to the to-be-tested smart contract is first determined as a first test case, and then it is determined whether a new program path is covered when the to-be-tested smart contract executes the first test case. If a new program path is covered when the to-be-tested smart contract executes the first test case, the first test case is determined as the current test case. If a new program path is not covered when the to-be-tested smart contract executes the first test case, a second test case is determined as the current test case. The second test case is a test case that has been input to the to-be-tested smart contract and through mutation of which the first test case is obtained.

After executing a test case, the to-be-tested smart contract generates feedback information for the test case. The feedback information includes a code coverage status of the to-be-tested smart contract in the process of executing the test case. For example, the feedback information can be code coverage information, and it is determined, based on the feedback information, whether a new program path is covered when the to-be-tested smart contract executes the test case. If a new program path is covered when the to-be-tested smart contract executes the first test case, the first test case can be mutated again to try to obtain a test case that can cover the new program path. Therefore, the first test case is determined as the current test case. If a new program path is not covered when the to-be-tested smart contract executes the first test case, it is also difficult to generate a test case that can cover a new program path by mutating the first test case. Therefore, a second test case used when the first test case is obtained through mutation can be determined, and the second test case is determined as the current test case, so that a new test case is generated through mutation based on the second test case.

For example, test case 1 is mutated to obtain test case 2, and feedback information of the to-be-tested smart contract is obtained after the to-be-tested smart contract executes test case 2. If it is determined, based on the feedback information, that a new program path is covered when the to-be-tested smart contract executes test case 2, test case 2 is determined as the current test case, and test case 2 is mutated to obtain a new test case. If it is determined, based on the feedback information, that a new program path is not covered when the to-be-tested smart contract executes test case 2, test case 1 is determined as the current test case, and test case 1 is mutated again to obtain a new test case. It needs to be ensured that the test case obtained by mutating test case 1 again is different from test case 2.

After the to-be-tested smart contract executes a test case, feedback information of the to-be-tested smart contract is used. If it is determined, based on the feedback information, that a new program path is covered when the to-be-tested smart contract executes the test case, the test case is mutated to generate a new test case. If it is determined, based on the feedback information, that a new program path is not covered when the to-be-tested smart contract executes the test case, a test case used when the test case is generated through mutation is mutated again to generate a new test case. As such, a test case used for generating a test case through mutation is determined based on execution feedback, so that a test case that can cover a new program path can be generated more quickly, and the efficiency of testing the to-be-tested smart contract can be improved.

It can be understood that the test case generated can be input to the to-be-tested smart contract by using a blockchain execution engine, and execution feedback (feedback information) of the to-be-tested smart contract is obtained by using the blockchain execution engine, so that a new test case is generated again based on the execution feedback. In addition, instrumentation can be performed in the to-be-tested smart contract. After the to-be-tested smart contract performs execution at an instrumentation location, the value of the instrumentation is set to 0 or 1. Then, after the to-be-tested smart contract executes a test case, which program paths are covered can be determined based on the quantity of instrumentations set to 0 or 1, in other words, feedback information can be obtained.

In one or more embodiments, an initial test case can be obtained. By parsing the initial test case, the value of each piece of raw type data in the initial test case is obtained as a user dictionary of the corresponding raw type data. When the to-be-tested structured parameter is mutated, at least one piece of to-be-mutated raw type data is first determined from all the pieces of raw type data included in the current test case based on a predetermined parameter value mutation policy. Then, for each piece of to-be-mutated raw type data selected, a user dictionary corresponding to the to-be-mutated raw type data is determined, and at least one of modifying a byte value, deleting a byte, inserting a byte, and shifting a byte is performed on the user dictionary corresponding to the to-be-mutated raw type data based on the parameter value mutation policy.

The initial test case is a test case that can be normally executed by the to-be-tested smart contract. Therefore, the value of each piece of raw type data in the initial test case is also a normal value that can be identified by the to-be-tested smart contract. The value of each piece of raw type data in the initial test case is used as a user dictionary of the corresponding raw type data. Subsequently, when parameter value mutation is performed on the raw type data, at least one of modifying a byte value, deleting a byte, inserting a byte, and shifting a byte is performed on the user dictionary corresponding to the raw type data, to implement parameter value mutation, so that it is ensured that the value of mutated raw type data can still be identified by the to-be-tested smart contract, thereby improving the efficiency of generating a valid test case.

Figure 4:
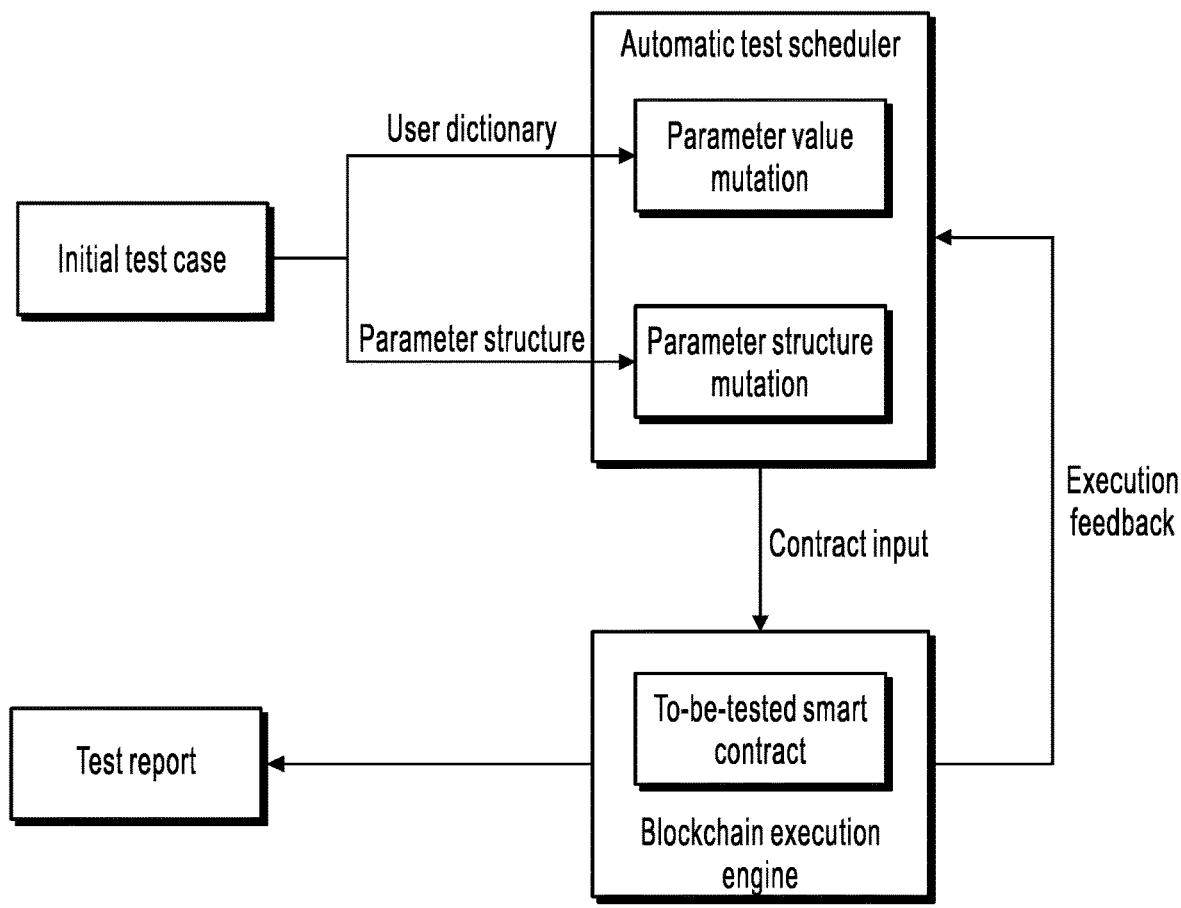
FIG. 4 is a schematic diagram illustrating another implementation scenario, according to one or more embodiments of the present specification.

Further, with reference to the method for generating a test case through parameter structure mutation and parameter value mutation, FIG. 4 is a schematic diagram illustrating an implementation scenario of one or more other embodiments disclosed in the present specification. As shown in FIG. 4, after generating the initial test case, the test personnel parse the initial test case to determine a parameter structure of each structured parameter in the initial test case, and determine the value of each piece of raw type data in the initial test case as a user dictionary. Then, an automatic test scheduler selects one or both of parameter value mutation and parameter structure mutation based on the parameter structure and the user dictionary determined, to mutate the test case to generate a new test case, and transmits the new test case generated to the to-be-tested smart contract as contract input. The blockchain execution engine drives the to-be-tested smart contract to execute the input test case, and transmits execution feedback provided by the to-be-tested smart contract to the automatic test scheduler, and the automatic test scheduler mutates the test case previously generated again to obtain a new test case according to the previously described method. The previous process is repeated until a test report of testing the to-be-tested smart contract is generated after the test coverage of the to-be-tested smart contract reaches a predetermined value.

Through the previously described process of generating a smart contract test case, on one hand, after a parameter structure of a to-be-mutated structured parameter is obtained, the to-be-mutated structured parameter is mutated based on the parameter structure to obtain a mutated structured parameter, and then a test case including the mutated structured parameter is obtained, to ensure that the test case generated can be parsed and executed by a to-be-tested smart contract, and cover a deeper program path in the to-be-tested smart contract, thereby improving the efficiency of testing the to-be-tested smart contract. In addition, parameter structure mutation of an intermediate granularity is used to mutate the quantity and sequence of raw type data in a structured parameter, and parameter value mutation of the finest granularity is used to mutate the value of the raw type data. A combination of the previous mutation methods of two granularities is used to mutate a test case to generate a new test case, so that it is ensured that the test case generated conforms to the service logic of the to-be-tested smart contract, and the test case generated can cover more program paths in the to-be-tested smart contract, thereby improving the comprehensiveness and efficiency of testing the smart contract.

Figure 5:
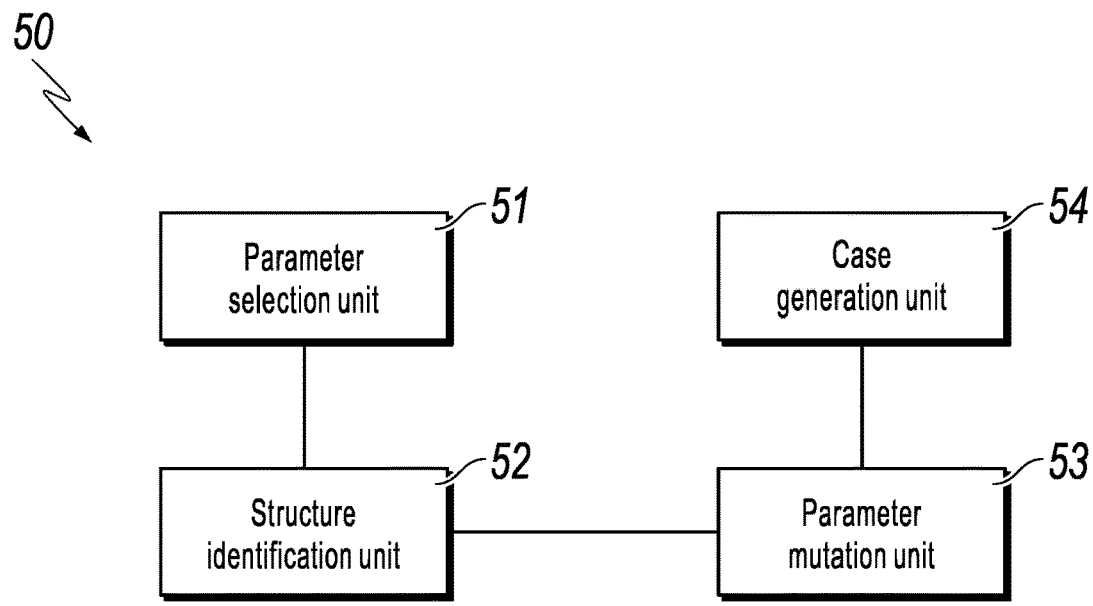
FIG. 5 is a schematic diagram illustrating an apparatus for generating a smart contract test case, according to one or more embodiments of the present specification.

One or more embodiments of another aspect further provide an apparatus for generating a smart contract test case. FIG. 5 illustrates an apparatus for generating a smart contract test case, according to one or more embodiments. It can be understood that the apparatus can be implemented by any apparatus, device, platform, or device cluster with computing and processing capabilities. As shown in FIG. 5, the apparatus 50 includes:

a parameter selection unit 51, configured to select, for a current test case, at least one to-be-mutated structured parameter from structured parameters included in the test case, where the to-be-mutated structured parameter can be identified by at least one interface of a to-be-tested smart contract;

a structure identification unit 52, configured to: for each to-be-mutated structured parameter selected by the parameter selection unit 51, obtain a parameter structure corresponding to the to-be-mutated structured parameter, where the parameter structure is determined by analyzing a pre-constructed sample structured parameter, and the sample structured parameter can be identified by at least one interface of the to-be-tested smart contract;

a parameter mutation unit 53, configured to: for each to-be-mutated structured parameter, mutating the to-be-mutated structured parameter based on the parameter structure corresponding to the to-be-mutated structured parameter that is obtained by the structure identification unit 52, to obtain a mutated structured parameter; and a case generation unit 54, configured to generate a test case including each mutated structured parameter obtained by the parameter mutation unit 53, and use the test case as a test case input to the to-be-tested smart contract.

Figure 6:
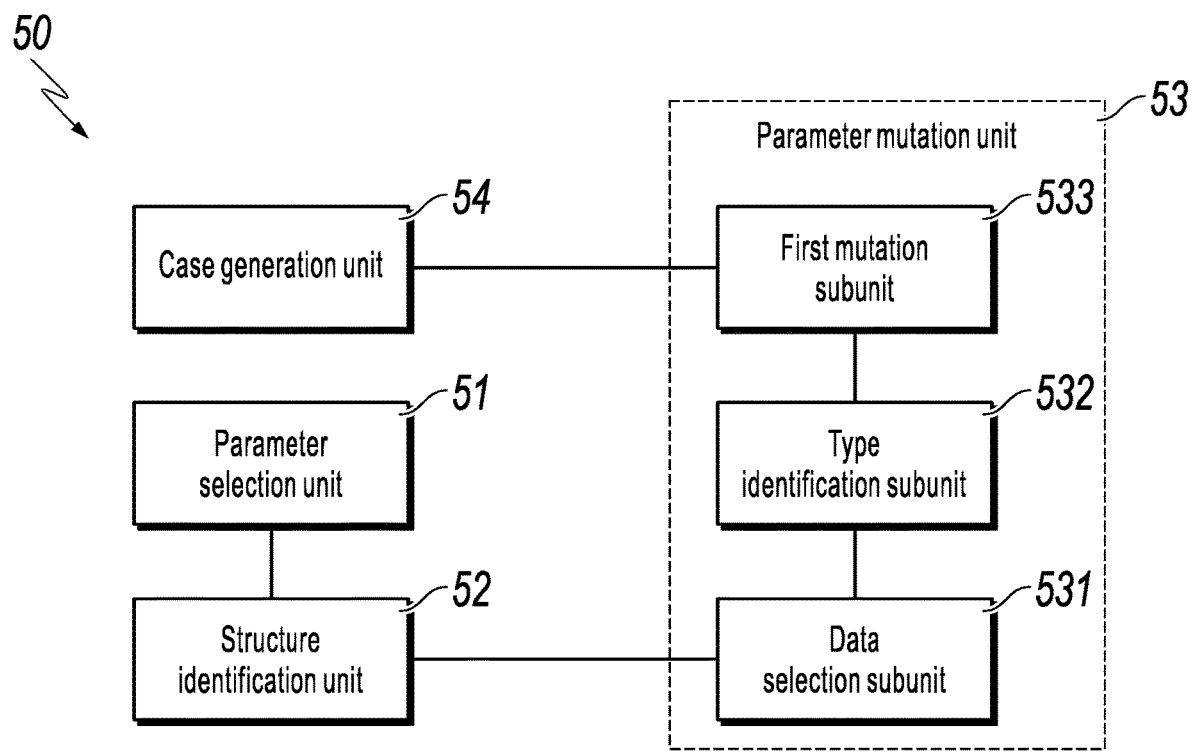
FIG. 6 is a schematic diagram illustrating another apparatus for generating a smart contract test case, according to one or more embodiments of the present specification.

In a possible implementation, each structured parameter includes at least one piece of raw type data, and the parameter structure includes a data type of raw type data. In this case, as shown in FIG. 6, the parameter mutation unit 53 includes:

a data selection subunit 531, configured to select at least one piece of to-be-mutated raw type data from all pieces of raw type data included in one to-be-mutated structured parameter;

a type identification subunit 532, configured to determine a data type of each piece of to-be-mutated raw type data selected by the data selection subunit 531 based on the parameter structure corresponding to the to-be-mutated structured parameter; and a first mutation subunit 533, configured to perform parameter value mutation on the to-be-mutated raw type data based on the data type of each piece of to-be-mutated raw type data that is determined by the type identification subunit 532, to change a parameter value of a to-be-mutated structured parameter including the to-be-mutated raw data type.

Further, the first mutation subunit 533 is configured to: for each piece of to-be-mutated raw type data, if a data type of the to-be-mutated raw type data is a data type with an unlimited length, perform at least one of modifying a byte value, deleting a byte, inserting a byte, and shifting a byte on the to-be-mutated raw type data; or if a data type of the to-be-mutated raw type data is a data type with a limited length, perform at least one of modifying a byte value and shifting a byte on the to-be-mutated raw type data.

Further, the data type with an unlimited length includes a string type; and the data type with a limited length includes a 64-bit integer type or a 256-bit hash type.

Figure 7:
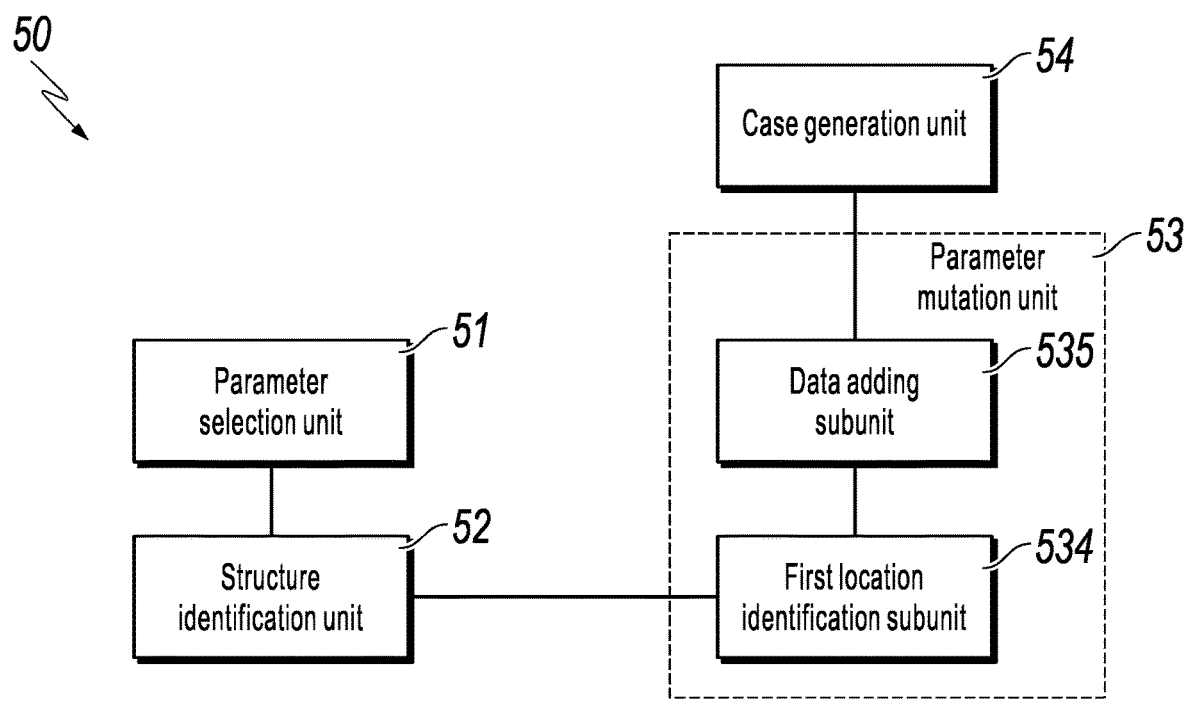
FIG. 7 is a schematic diagram illustrating an apparatus, including a data adding subunit, for generating a smart contract test case, according to one or more embodiments of the present specification.

In a possible implementation, each structured parameter includes at least one piece of raw type data, and the parameter structure includes a start location or an end location of raw type data. In this case, as shown in FIG. 7, the parameter mutation unit 53 includes:

a first location identification subunit 534, configured to determine a start location or an end location of each piece of raw type data in the to-be-mutated structured parameter based on a start location or an end location of at least one piece of raw type data included in the parameter structure; and a data adding subunit 535, configured to: for one to-be-mutated structured parameter, add at least one piece of raw type data before a start location or after an end location of at least one piece of raw type data included in the to-be-mutated structured parameter based on the start location or the end location of each piece of raw type data in the to-be-mutated structured parameter that is determined by the first location identification subunit 534, to change the parameter structure of the to-be-mutated structured parameter.

Figure 8:
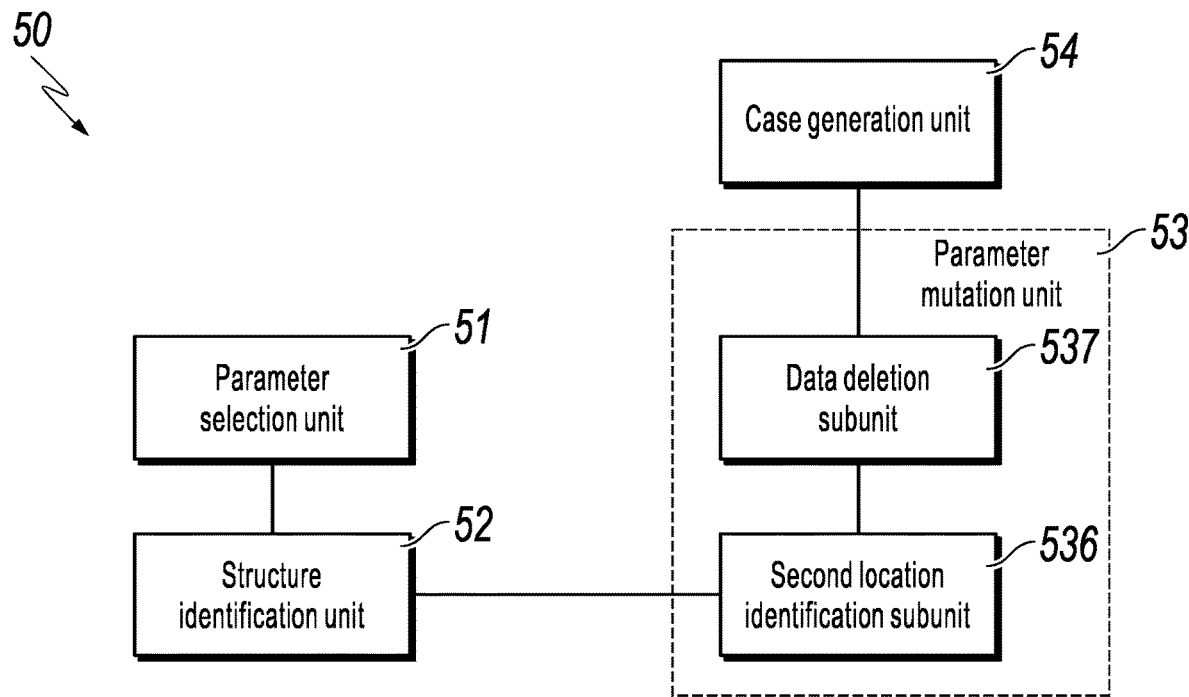
FIG. 8 is a schematic diagram illustrating an apparatus, including a data deletion subunit, for generating a smart contract test case, according to one or more embodiments of the present specification.

In a possible implementation, each structured parameter includes at least two pieces of raw type data, and the parameter structure includes a start location or an end location of raw type data. In this case, as shown in FIG. 8, the parameter mutation unit 53 includes:

a second location identification subunit 536, configured to determine a start location or an end location of each piece of raw type data in the to-be-mutated structured parameter based on the start location or the end location of the raw type data included in the parameter structure; and a data deletion subunit 537, configured to: for one to-be-mutated structured parameter, delete at least one piece of raw type data in the to-be-mutated structured parameter based on the start location or the end location of each piece of raw type data in the to-be-mutated structured parameter that is determined by the second location identification subunit 536, to change the parameter structure of the to-be-mutated structured parameter.

Figure 9:
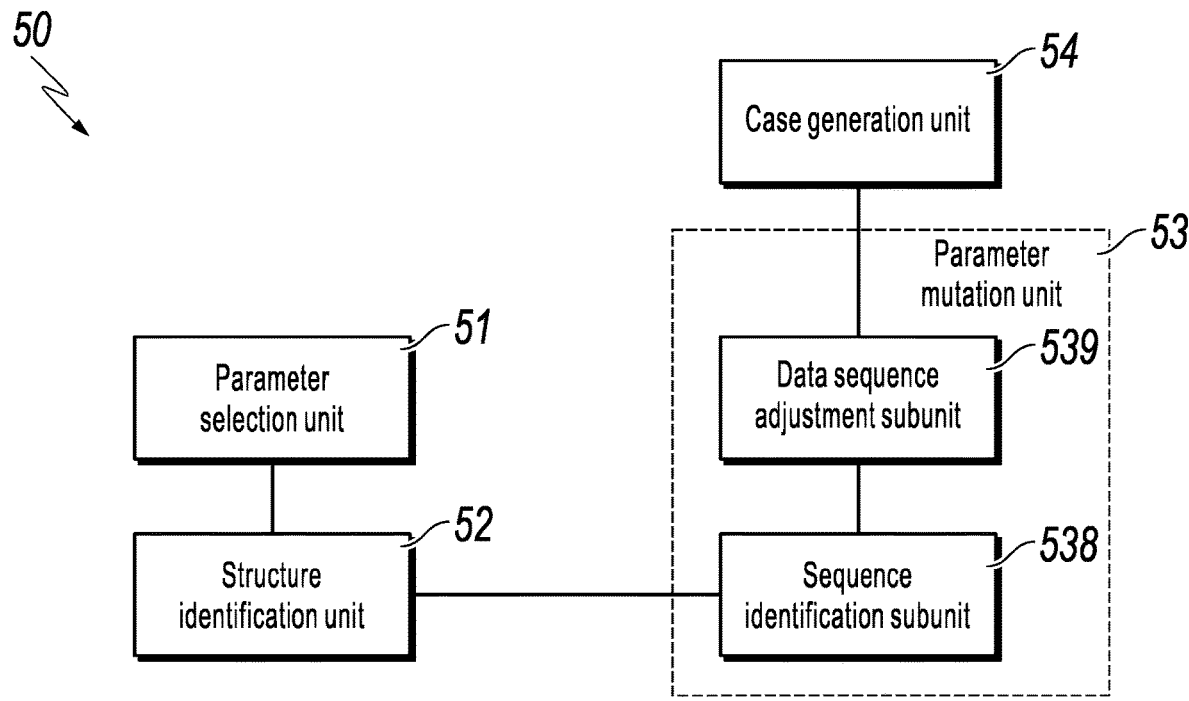
FIG. 9 is a schematic diagram illustrating an apparatus, including a data sequence adjustment subunit, for generating a smart contract test case, according to one or more embodiments of the present specification.

In a possible implementation, each structured parameter includes at least two pieces of raw type data, and the parameter structure includes a sequence of all pieces of raw type data. In this case, as shown in FIG. 9, the parameter mutation unit 53 includes:

a sequence identification subunit 538, configured to determine a sequence of all pieces of raw type data in one to-be-mutated structured parameter based on the parameter structure corresponding to the to-be-mutated structured parameter; and a data sequence adjustment subunit 539, configured to: for one to-be-mutated structured parameter, change a sequence of all pieces of raw type data in the to-be-mutated structured parameter based on a sequence of all the pieces of raw type data in the to-be-mutated structured parameter that is determined by the sequence identification subunit 538, to change a parameter structure of the to-be-mutated structured parameter.

Figure 10:
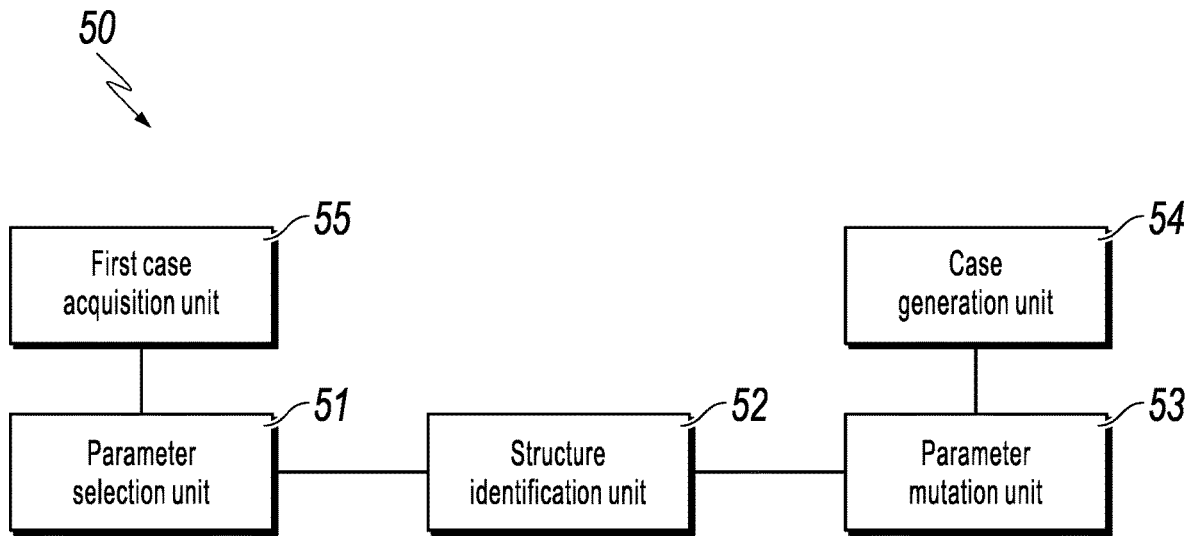
FIG. 10 is a schematic diagram illustrating still another apparatus for generating a smart contract test case, according to one or more embodiments of the present specification.

In a possible implementation, based on the apparatus 50 for generating a smart contract test case shown in FIG. 5, as shown in FIG. 10, the apparatus 50 for generating a smart contract test case can further include:

a first case acquisition unit 55, configured to determine a test case previously executed by the to-be-tested smart contract as the current test case.

Figure 11:
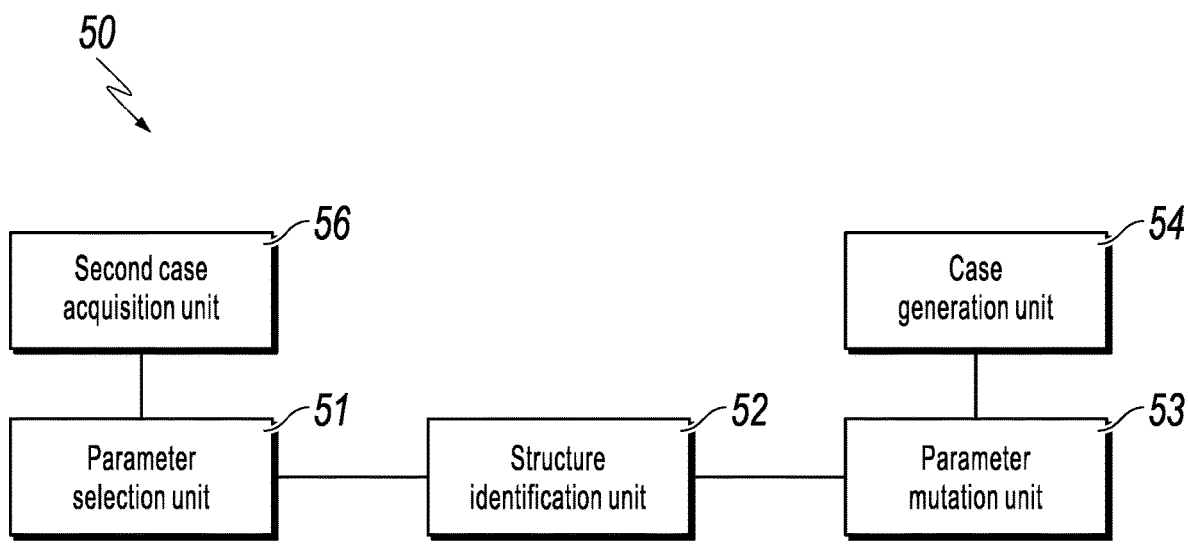
FIG. 11 is a schematic diagram illustrating yet another apparatus for generating a smart contract test case, according to one or more embodiments of the present specification.

In a possible implementation, based on the apparatus 50 for generating a smart contract test case shown in FIG. 5, as shown in FIG. 11, the apparatus 50 for generating a smart contract test case can further include:

a second case acquisition unit 56, configured to determine a test case manually generated as the current test case.

In a possible implementation, based on the apparatus 50 for generating a smart contract test case shown in FIG. 10, the first case acquisition unit 55 is configured to determine a previous test case input to the to-be-tested smart contract as a first test case; determine whether a new program path is covered when the to-be-tested smart contract executes the first test case; and if yes, determine the first test case as the current test case; or if no, determine a second test case as the current test case, where the second test case satisfies the following: the second test case has been input to the to-be-tested smart contract, and the first test case is obtained by mutating a structured parameter in the second test case.

It is worthwhile to note that the structure shown in one or more embodiments of the present specification does not constitute a specific limitation on the apparatus for generating a smart contract test case. In other embodiments of the present specification, the apparatus for generating a smart contract test case can include more or fewer components than those shown in the figure, or can combine some components, or can split some components, or can have different component arrangements. The components shown can be implemented by hardware, software, or a combination of software and hardware.

Content such as information exchange between units and execution processes in the previous apparatus and execution processes is based on the same concept as the method embodiments of the present specification. For specific content, references can be made to the description in the method embodiments of the present specification. Details are omitted here for simplicity.

One or more embodiments of still another aspect further provide a computer-readable storage medium. The computer-readable storage medium stores computer programs, and when being executed in a computer, the computer programs enable the computer to perform the methods for generating a smart contract test case described in the previous embodiments.

One or more embodiments of yet another aspect further provide a computing device, including a memory and a processor. The memory stores executable code, and the processor implements the method for generating a smart contract test case described in the previous embodiments when executing the executable code.

A person skilled in the art should be aware that in the previous one or more examples, functions described in the present specification can be implemented by hardware, software, firmware, or any combination thereof. When the functions are implemented by software, the functions can be stored in a computer-readable medium or transmitted as one or more instructions or code in the computer-readable medium.

The objectives, technical solutions, and benefits of the present specification are further described in detail in the previous specific implementations. It should be understood that the previous descriptions are merely specific implementations of the present specification, but are not intended to limit the protection scope of the present specification. Any modification, equivalent replacement, or improvement made on the basis of the technical solutions of the present specification shall fall within the protection scope of the present specification.

What is claimed is:

1. A method for generating a smart contract test case, comprising:
   selecting, from a first test case, at least one first structured parameter to be mutated from a plurality of structured parameters in the first test case, wherein the first structured parameter can be identified by at least one interface of a smart contract, and wherein each first structured parameter comprises at least one piece of raw type data;
   obtaining, for each first structured parameter, a structure corresponding to the first structured parameter, wherein the structure is determined by analyzing a sample structured parameter that was pre-constructed, wherein the structure comprises a data type of the piece of raw type data, and the sample structured parameter can be identified by at least one interface of the smart contract;
   for each first structured parameter, mutating the first structured parameter based on the structure corresponding to the first structured parameter, to obtain a second structured parameter, comprising:
      selecting at least one piece of raw type data from all pieces of raw type data comprised in the first structured parameter,
      determining the data type of each selected piece of raw type data based on the structure corresponding to the first structured parameter, and
      performing parameter value mutation on the selected piece of raw type data based on the data type of each selected piece of raw type data, to change a parameter value of the first structured parameter, comprising:
         determining if the data type of the selected piece of raw type data is a data type with an unlimited length;
         in response to determining the data type of the selected piece of raw type data is a data type with an unlimited length, performing at least one of modifying a byte value, deleting a byte, inserting a byte, and shifting a byte on the to-be-mutated raw type data; and
         in response to determining the data type of the selected piece of raw type data is not a data type with an unlimited length, performing at least one of modifying a byte value and shifting a byte on the to-be-mutated raw type data; and
   generating a second test case comprising each second structured parameter, and using the second test case as input to the smart contract.

2. The method according to claim 1, wherein the data type is a 64-bit integer type, a 256-bit hash type, or a string type.

3. The method according to claim 1, wherein each first structured parameter comprises at least one piece of raw type data, and the structure comprises a start location or an end location of raw type data; and
   mutating the first structured parameter based on the structure corresponding to the first structured parameter comprises:
      determining a start location or an end location of each piece of raw type data in the first structured parameter based on the corresponding structure; and
      adding at least one piece of raw type data before a start location or after an end location of at least one piece of raw type data in the first structured parameter, to change the structure of the first structured parameter.

4. The method according to claim 1, wherein each first structured parameter comprises at least two pieces of raw type data, and the structure comprises a start location or an end location of each raw type data; and
   mutating the first structured parameter based on the structure corresponding to the first structured parameter comprises:
      determining a start location or an end location of each piece of raw type data in the first structured parameter based on the corresponding structure; and
      deleting at least one piece of raw type data based on the start location or the end location of each piece of raw type data in the first structured parameter, to change the structure of the first structured parameter.

5. The method according to claim 1, wherein each first structured parameter comprises at least two pieces of raw type data, and the structure comprises a sequence of all pieces of raw type data in the corresponding first structured parameter; and
   mutating the first structured parameter based on the structure corresponding to the first structured parameter comprises:
      determining a sequence of all pieces of raw type data in the first structured parameter based on the structure corresponding to the first structured parameter; and
      changing the sequence of all the pieces of raw type data in the first structured parameter, to change the structure of the first structured parameter.

6. The method according to claim 1, wherein before selecting, from a first test case, at least one first structured parameter, the method comprises:
   determining a test case that was previously executed by the smart contract as the first test case; or determining a test case that was manually generated as the first test case.

7. The method according to claim 6, wherein the determining a test case that was previously executed by the smart contract as the first test case comprises:
   determining a previous test case input to the smart contract as a third test case; determining whether a new program path is covered when the smart contract executes the third test case; and
   in response to determining that a new program path is covered when the smart contract executes the third test case, determining the third test case as the first test case; and
   in response to determining that a new program path is not covered when the smart contract executes the third test case, determining a fourth test case as the first test case, wherein the fourth test case satisfies the following: the fourth test case has been input to the smart contract, and the third test case is obtained by mutating a structured parameter in the fourth test case.

8. A non-transitory, computer-readable medium storing one or more instructions executable by a computer system to perform operations comprising:
   selecting, from a first test case, at least one first structured parameter to be mutated from a plurality of structured parameters in the first test case, wherein the first structured parameter can be identified by at least one interface of a smart contract, and wherein each first structured parameter comprises at least one piece of raw type data;
   obtaining, for each first structured parameter, a structure corresponding to the first structured parameter, wherein the structure is determined by analyzing a sample structured parameter that was pre-constructed, wherein the structure comprises a data type of the piece of raw type data, and the sample structured parameter can be identified by at least one interface of the smart contract;
   for each first structured parameter, mutating the first structured parameter based on the structure corresponding to the first structured parameter, to obtain a second structured parameter, comprising:
      selecting at least one piece of raw type data from all pieces of raw type data comprised in the first structured parameter,
      determining the data type of each selected piece of raw type data based on the structure corresponding to the first structured parameter, and
      performing parameter value mutation on the selected piece of raw type data based on the data type of each selected piece of raw type data, to change a parameter value of the first structured parameter, comprising:
         determining if the data type of the selected piece of raw type data is a data type with an unlimited length;
            in response to determining the data type of the selected piece of raw type data is a data type with an unlimited length, performing at least one of modifying a byte value, deleting a byte, inserting a byte, and shifting a byte on the to-be-mutated raw type data; and
            in response to determining the data type of the selected piece of raw type data is not a data type with an unlimited length, performing at least one of modifying a byte value and shifting a byte on the to-be-mutated raw type data; and generating a second test case comprising each second structured parameter, and using the second test case as input to the smart contract.

9. The computer-readable medium of claim 8, wherein the data type is a 64-bit integer type, a 256-bit hash type, or a string type.

10. The computer-readable medium of claim 8, wherein each first structured parameter comprises at least one piece of raw type data, and the structure comprises a start location or an end location of raw type data; and
   mutating the first structured parameter based on the structure corresponding to the first structured parameter comprises:
      determining a start location or an end location of each piece of raw type data in the first structured parameter based on the corresponding structure; and
      adding at least one piece of raw type data before a start location or after an end location of at least one piece of raw type data in the first structured parameter, to change the structure of the first structured parameter.

11. The computer-readable medium of claim 8, wherein each first structured parameter comprises at least two pieces of raw type data, and the structure comprises a start location or an end location of each raw type data; and
   mutating the first structured parameter based on the structure corresponding to the first structured parameter comprises:
      determining a start location or an end location of each piece of raw type data in the first structured parameter based on the corresponding structure; and
      deleting at least one piece of raw type data based on the start location or the end location of each piece of raw type data in the first structured parameter, to change the structure of the first structured parameter.

12. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   selecting, from a first test case, at least one first structured parameter to be mutated from a plurality of structured parameters in the first test case, wherein the first structured parameter can be identified by at least one interface of a smart contract, and wherein each first structured parameter comprises at least one piece of raw type data;
   obtaining, for each first structured parameter, a structure corresponding to the first structured parameter, wherein the structure is determined by analyzing a sample structured parameter that was pre-constructed, wherein the structure comprises a data type of the piece of raw type data, and the sample structured parameter can be identified by at least one interface of the smart contract;
   for each first structured parameter, mutating the first structured parameter based on the structure corresponding to the first structured parameter, to obtain a second structured parameter, comprising:
      selecting at least one piece of raw type data from all pieces of raw type data comprised in the first structured parameter,
      determining the data type of each selected piece of raw type data based on the structure corresponding to the first structured parameter, and performing parameter value mutation on the selected piece of raw type data based on the data type of each selected piece of raw type data, to change a parameter value of the first structured parameter, comprising:
  determining if the data type of the selected piece of raw type data is a data type with an unlimited length;
    in response to determining the data type of the selected piece of raw type data is a data type with an unlimited length, performing at least one of modifying a byte value, deleting a byte, inserting a byte, and shifting a byte on the to-be-mutated raw type data; and
    in response to determining the data type of the selected piece of raw type data is not a data type with an unlimited length, performing at least one of modifying a byte value and shifting a byte on the to-be-mutated raw type data; and generating a second test case comprising each second structured parameter, and using the second test case as input to the smart contract.

13. The system of claim 12, wherein the data type is a 64-bit integer type, a 256-bit hash type, or a string type.

14. The system of claim 12, wherein each first structured parameter comprises at least one piece of raw type data, and the structure comprises a start location or an end location of raw type data; and
  mutating the first structured parameter based on the structure corresponding to the first structured parameter comprises:
    determining a start location or an end location of each piece of raw type data in the first structured parameter based on the corresponding structure; and
    adding at least one piece of raw type data before a start location or after an end location of at least one piece of raw type data in the first structured parameter, to change the structure of the first structured parameter.

* * * * *